(12) United States Patent
Lai

(10) Patent No.: US 7,711,801 B2
(45) Date of Patent: May 4, 2010

(54) DHCP CLIENT/SERVER DEVICE AND METHOD OF PROVIDING DHCP SERVER SERVICES ON A NETWORK

(75) Inventor: Siew Yee Lai, Perak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 475 days.

(21) Appl. No.: 11/602,877

(22) Filed: Nov. 20, 2006

(65) Prior Publication Data

US 2008/0120365 A1 May 22, 2008

(51) Int. Cl.
*G06F 15/177* (2006.01)
*G06F 15/16* (2006.01)
(52) U.S. Cl. .................. 709/220; 709/228; 709/245
(58) Field of Classification Search .............. 709/228, 709/245
See application file for complete search history.

(56) References Cited

U.S. PATENT DOCUMENTS 6,957,276 B1 * 10/2005 Bahl ..................... 709/245

2005/0108408 A1 * 5/2005 Ookubo ................ 709/228
2006/0218252 A1 9/2006 Ford
2007/0002761 A1 * 1/2007 Diamant et al. .......... 370/252

FOREIGN PATENT DOCUMENTS

WO WO-99/12313 3/1999
WO WO-01/75626 10/2001

OTHER PUBLICATIONS

Unicoi Systems, Inc., "Fusion Embedded DHCP Client/Server", 2006, p. 1-2, http://www.unicoi.com/fusion_net/fusion_dhcp_clientserver.htm.

* cited by examiner

*Primary Examiner*—Patrice Winder
*Assistant Examiner*—Minh-Chau Nguyen

(57) ABSTRACT

A Dynamic Host Configuration Protocol (DHCP) client/server device and method of providing DHCP server services on a network uses a set of commands to convert the DHCP client/server device to function as a DHCP server. The DHCP client/server device is converted when a response message in response to a request message for an IP address from the DHCP client/server device over the network is not received within a predetermined time period.

18 Claims, 4 Drawing Sheets

DHCP CLIENT/SERVER DEVICE AND METHOD OF PROVIDING DHCP SERVER SERVICES ON A NETWORK

BACKGROUND OF THE INVENTION

Dynamic Host Configuration Protocol (DHCP) is a protocol that automates the process of assigning Internet Protocol (IP) addresses, subnet masks, routers and other IP parameters in a network, such as local area network (LAN). In a LAN that uses the DHCP standard, DHCP client devices such as laptop computers, desktop computers, workstations, personal digital assistants (PDAs), network printers and other input/output devices receive these IP parameters from a dedicated DHCP server. The process of assigning IP parameters is initiated by a DHCP client device, which sends a query to the DHCP server requesting one or more IP parameters on the LAN. The query from the DHCP client device is then received by the DHCP server, which responds with the IP parameters requested by the DHCP client device.

In a typical LAN that uses the DHCP standard, a number of DHCP client devices and a DHCP server are connected to each other via a network switch or hub. The network switch or hub enables each of the DHCP client devices and the DHCP server to communicate with other devices on the LAN. Thus, each DHCP client device is able to receive IP parameters from the DHCP server as long as there is connectivity between that DHCP client and the DHCP server. However, problems arise when the DHCP server is not available in the LAN due to server failure and/or loss of connectivity between the DHCP server and the network switch or hub.

One of the problems that arise due to the unavailability of a DHCP server is that IP addresses cannot be automatically assigned to devices that are trying to connect to the network. Without IP addresses, these devices are not able to function and communicate over the network. In this case, IP addresses would have to be manually assigned to the connecting devices, which is a complicated process especially for users who lack networking experience.

Thus, there is a need for a device and method for providing DHCP server services, including IP address assigning, when a DHCP server is unavailable.

SUMMARY OF THE INVENTION

A Dynamic Host Configuration Protocol (DHCP) client/server device and method of providing DHCP server services on a network uses a set of commands to convert the DHCP client/server device to function as a DHCP server. The DHCP client/server device is converted when a response message in response to a request message for an IP address from the DHCP client/server device over the network is not received within a predetermined time period. Consequently, the DHCP client/server device is able to automatically assign an IP address to itself and communicate over the network without having a user manually assign an IP address to the DHCP client/server device. In addition, the DHCP client/server device is able to provide DHCP server services to DHCP client devices on the network even though a dedicated DHCP server is not available.

A DHCP client/server device in accordance with an embodiment of the invention comprises a network interface to connect to a network and a processor operably connected to the network interface to transmit and receive data. The processor is configured to send a request message for an IP address over the network. The processor is further configured to execute a set of commands to convert the DHCP client/server device to function as a DHCP server when a response message with an assigned IP address in response to the request message is not received within a predetermined time period.

A method of providing DHCP server services on a network in accordance with an embodiment of the invention comprises sending a request message for an IP address over the network from a DHCP client/server device, waiting for a response message with an assigned IP address in response to the request message for a predetermined time period at the DHCP client/server device, and executing a set of commands at the DHCP client/server device to convert the DHCP client/server device to function as a DHCP server when the response message is not received within the predetermined time period.

Other aspects and advantages of the present invention will become apparent from the following detailed description, taken in conjunction with the accompanying drawings, illustrated by way of example of the principles of the invention.

DETAILED DESCRIPTION

Figure 1:
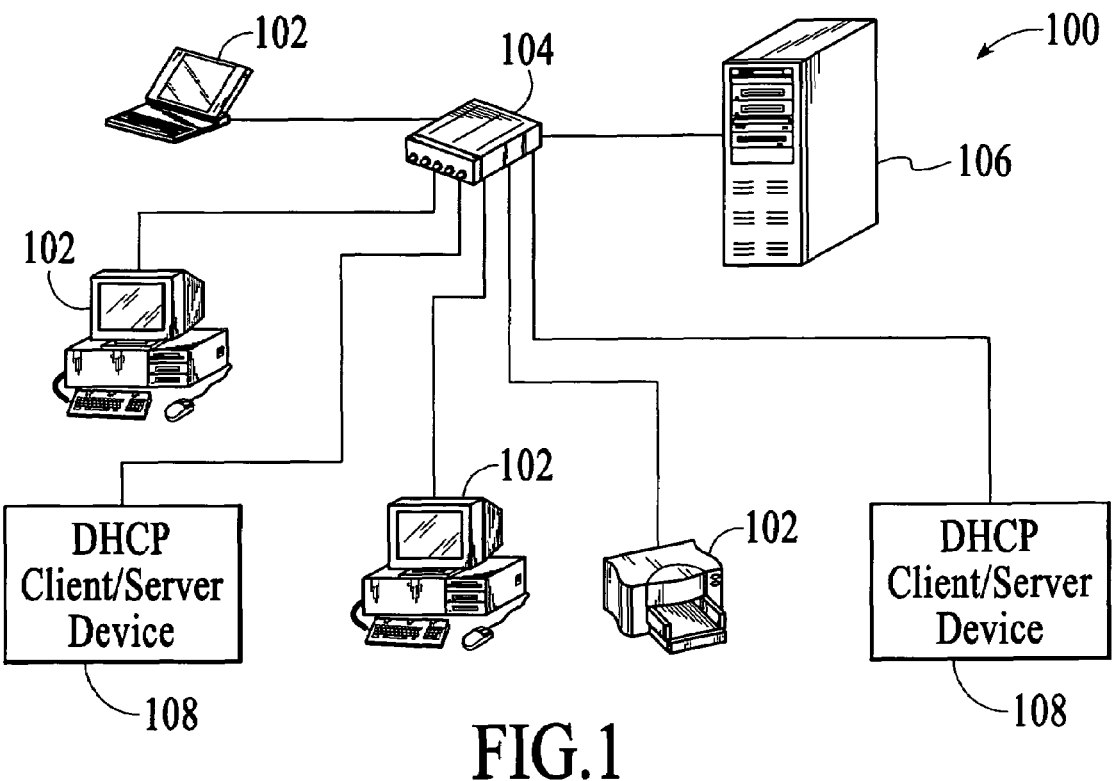
FIG. 1 is a diagram of a network with at least one DHCP client/server device with a DHCP server conversion capability in accordance with an embodiment of the invention.

With reference to FIG. 1, a network 100 in accordance with an embodiment of the invention is described. The network 100 uses Dynamic Host Configuration Protocol (DHCP) to provide server services to client devices within the network. In this embodiment, the network 100 is a large area network (LAN). However, in other embodiments, the network 100 can be a different type of a network.

As shown in FIG. 1, the network 100 includes a number of conventional DHCP client devices 102, which are connected to a network switch 104. In other embodiments, the network switch 104 may be replaced with a hub or a router. The DHCP client devices 102 may include laptop computers, desktop computers, workstations, minicomputers, personal digital assistants (PDAs), network printers and any other network-ready input/output devices. The network 100 also includes an optional DHCP server 106, which is also connected to the network switch 104. The optional DHCP server 106 is a conventional DHCP server, and thus, is a dedicated DHCP server. The DHCP server 106 provides server services to the DHCP client devices 102, including assigning IP addresses to the DHCP client devices 102.

The network 100 also includes one or more DHCP client devices 108 with a DHCP server conversion capability. These DHCP client devices 108 will be referred to herein as "DHCP client/server devices". As described in more detail below, each of the DHCP client/server devices 108 can function as a conventional DHCP client device when the DHCP server 106 is available on the network 100. However, when the DHCP server 106 is unavailable on the network 100, each of the DHCP client/server devices 108 can function as a DHCP server unless another DHCP client/server device 108 is already functioning as a DHCP server. Therefore, server services can be provided by one of the DHCP client/server devices 108 when the DHCP server 106 is unavailable on the network, including assigning an IP address to itself. Consequently, the DHCP client/server devices 108 can always function on the network 108 regardless of whether the DHCP server or another DHCP client/server device 108 is available on the network 100 to provide server services.

Figure 2A:
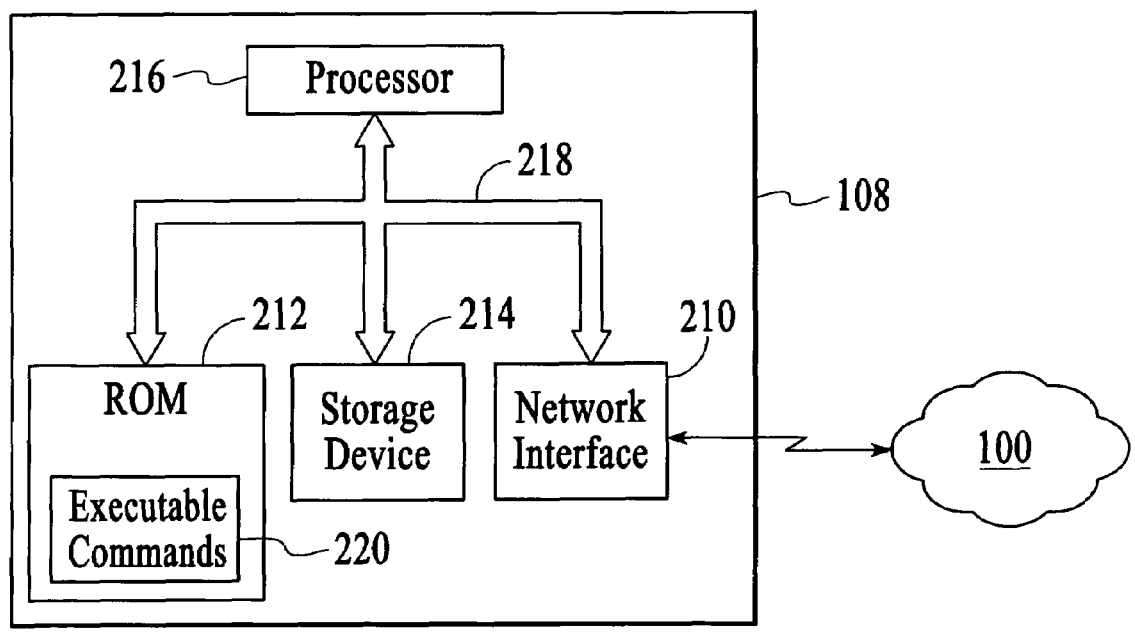
FIG. 2A is a block diagram of the components of the DHCP client/server device in accordance with an embodiment of the invention.

Turning now to FIG. 2A, the DHCP client/server device 108 in accordance with an embodiment of the invention is shown. As shown in FIG. 2A, the DHCP client/server device 108 includes a network interface 210, a read-only memory (ROM) 212, a storage device 214 and a processor 216, which are connected to a bus 218. The network interface 210 is configured to allow the DHCP client/server device 108 to communicate to the network 100. As an example, the network interface 210 may be a network card or adapter with a unique Media Access Control (MAC) stored in an internal ROM (not shown).

The ROM 212 is used to store information for the DHCP client/server device 108. In particular, the ROM 212 is used to store a set of executable commands 220, which is used to convert the DHCP client/server device 108 to function as a DHCP server when needed. However, the ROM 212 may be used to store other data. In an embodiment, the ROM 212 is a FLASH ROM.

The storage device 214 is also used to store data and computer programs needed by the DHCP client/server device 108. The storage device 214 may be a hard drive, which is commonly found in a personal computer. In other embodiments, the storage device 214 may be any type of computer memory, such as a FLASH memory.

The processor 216 is a digital signal processor that processes data to perform various functions. In particular, the processor 216 is configured or programmed to retrieve and execute the set of executable commands 220 stored in the ROM 212 to convert the DHCP client/server device 108 to function as a DHCP server when certain criteria are satisfied. Once the set of executable commands 220 are retrieved and executed, the processor 216 is configured or programmed to perform tasks, which are usually performed by a dedicated DHCP server such as the DHCP server 106. The operation of the processor 216 with respect to DHCP server functions of the DHCP client/server device 108 is described below.

The DHCP client/server device 108 can be any network input/output device, such as a laptop computer, a desktop computer, a workstation, a minicomputer, a PDA or a network printer. Thus, the DHCP client/server device 108 may include additional components, which are commonly found in these different types of network input/output devices. However, these additional components are not described herein so as to not obscure the inventive features of the DHCP client/server device 108.

Figure 2B:
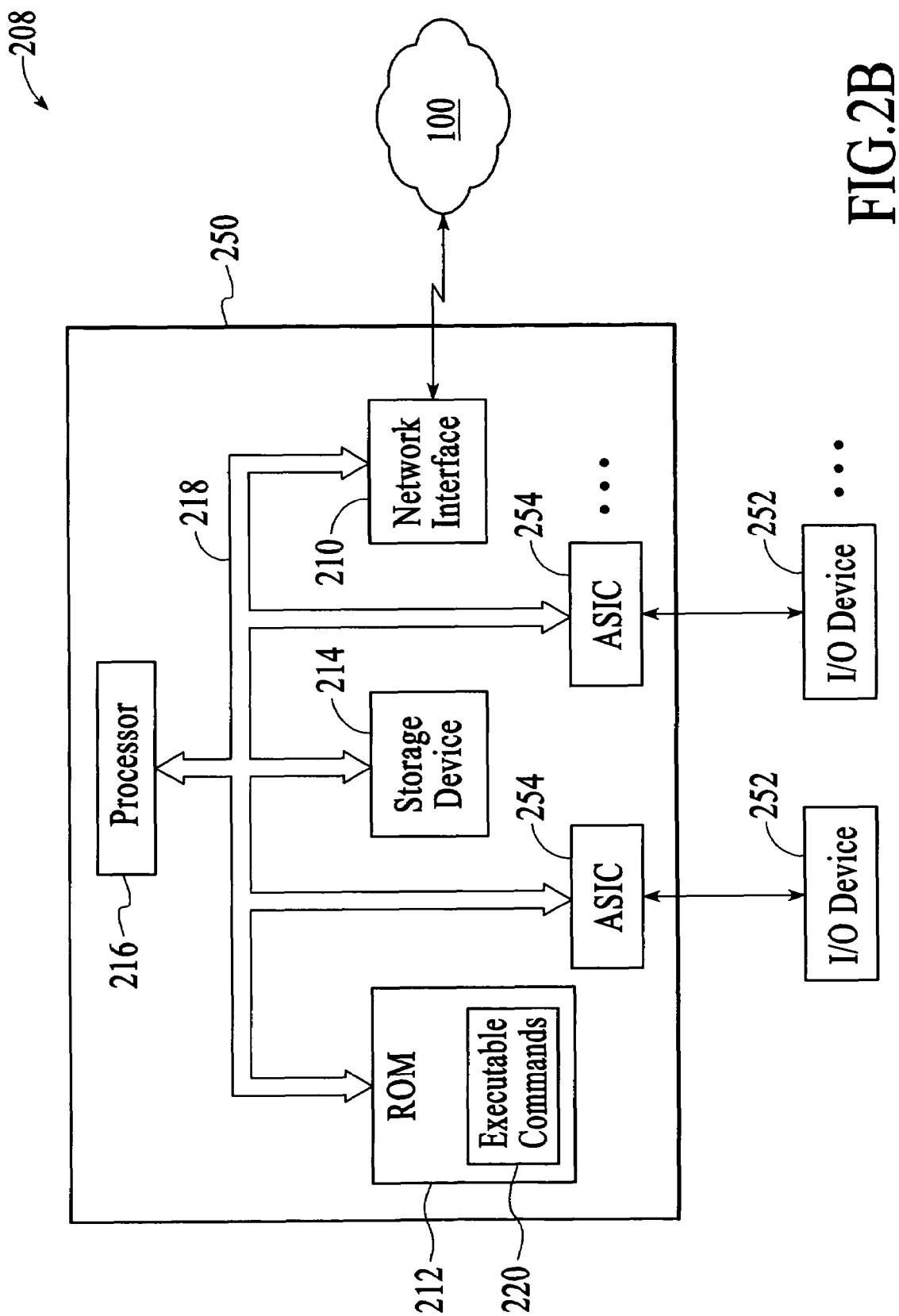
FIG. 2B is a block diagram of the components of the DHCP client/server device in the form of an industrial I/O system in accordance with an embodiment of the invention.

In an embodiment, the DHCP client/server device 108 may be an industrial input/output (I/O) system, as illustrated in FIG. 2B. The industrial I/O system 208 comprises an industrial I/O control module 250 and one or more industrial I/O devices 252. As used herein, an industrial I/O device is a device that provides electrical output signals in response to an external parameter being measured, e.g., temperature, pressure, current or voltage, and/or that can be controlled by electrical input signals to effectuate change of an external parameter, e.g., flow of gas or liquid. Typical industrial I/O devices include pumps, valves, mass flow controllers and thermocouples. The industrial I/O devices 252 of the I/O system 208 can be any type of industrial I/O devices.

Similar to the DHCP client/server device 108 of FIG. 2A, the industrial I/O system 208 includes the network interface 210, the ROM 212 with the executable commands 220, the storage device 214 and the processor 216, which are connected to the bus 218. However, the industrial I/O system 208 further includes application-specific integrated circuits (ASICs) 254, which are connected to the bus 218. Each ASIC 254 is also connected to one of the industrial I/O devices 252 to support that I/O device. The tasks performed by each of the ASICs 254 depend on the industrial I/O device 252 being supported by that ASIC. Thus, the ASICs 254 may be configured to convert electrical signals from the respective industrial I/O devices 252 into raw analog or digital values and/or to convert analog or digital values into electrical control signals, which are transmitted to the I/O devices 252. The processor 216 interfaces with the ASICs 254 to provide the analog or digital values to the ASICs and/or to receive and process the analog or digital values from the ASICs.

Figure 3:
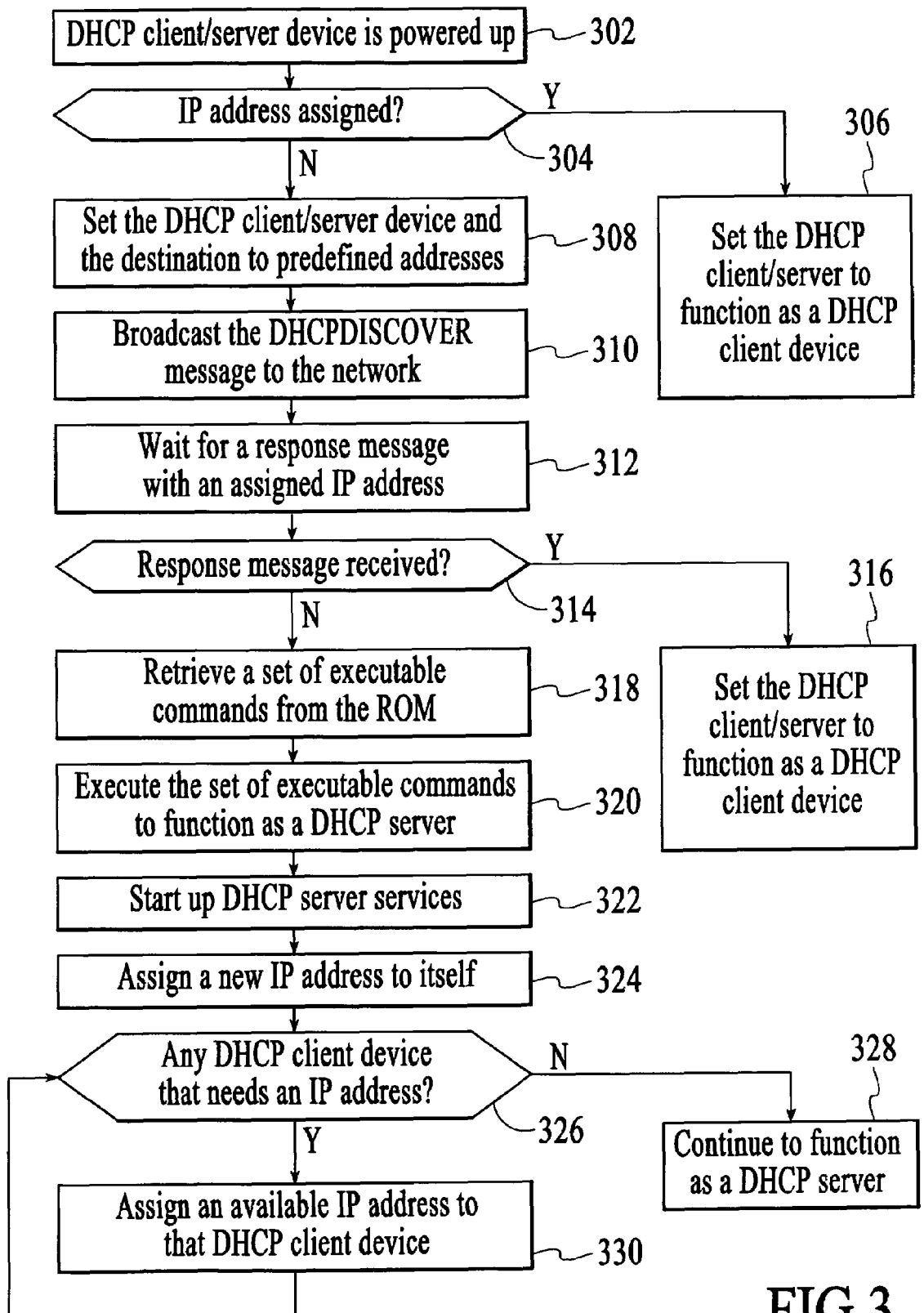
FIG. 3 is a process flow diagram of an operation of the DHCP client/server device in accordance with an embodiment of the invention.

The operation of the DHCP client/server device 108 of FIG. 2A to function as either a DHCP client device or a DHCP server is described with reference to a process flow diagram of FIG. 3. The operation of the industrial I/O system 208 to function as either a DHCP client device or a DHCP server is identical to that of the DHCP client/server device 108 of FIG. 2A, and thus, is not described separately herein. At block 302, the DHCP client/server device 108 is powered up, i.e., turned on. The DHCP client/server device 108 is assumed to be connected to the network 100. If not, the DHCP client/server device 108 is also connected to the network 100. Next, at block 304, the processor 216 of the DHCP client/server device 108 makes a determination whether an IP address is assigned to the DHCP client/server device.

If an IP address is assigned, the operation of the DHCP client/server device 108 proceeds to block 306, where the processor 216 sets the DHCP client/server device 108 to function as a DHCP client device. The DHCP client/server device 108 then proceeds to operate as a standard DHCP client device on the network 100.

However, if an IP address is not assigned, the operation of the DHCP client/server device 108 proceeds to block 308, where the processor 216 sets the IP address of DHCP client/server device 108 and the IP address of the destination to predefined addresses. As an example, the IP address of the DHCP client/server device 108 is set to 0.0.0.0 and the IP address of the destination is set to 255.255.255.255.

Next, at block 310, the processor 216 broadcast or transmits a DHCPDISCOVER message from the DHCP client/server device 108 to the network 100. The DHCPDISCOVER message is a request message for an IP address, which is targeted to an available DHCP server on the network 100. The DHCPDISCOVER message includes the MAC address of the DHCP client/server device 108 so that the available DHCP server, if any, will know which device has sent the message.

Next, at block 312, the processor 216 waits for a response message with an assigned IP address from an available DHCP server on the network 100 in response to the broadcast request message for a predetermined time period or duration. Next, at block 314, the processor 216 makes a determination whether a response message with an assigned IP address from an available DHCP server on the network 100 has been received by the DHCP client/server device 108.

If a response message with an assigned IP address has been received, the operation of the DHCP client/server device 108 proceeds to block 316, where the processor 216 sets the DHCP client/server device 108 to function as a DHCP client device. The response message with the assigned IP address may be from the DHCP server 106. Alternatively, the response message with the assigned IP address may be from another DHCP client/server device, which is currently functioning as a DHCP server. The DHCP client/server device 108 then proceeds to operate as a standard DHCP client device on the network 100.

However, if a response message with an assigned IP address has not been received, the operation of the DHCP client/server device 108 proceeds to block 318, where the processor 216 retrieves the set of executable commands 220 from the ROM 212 of the DHCP client/server device 108.

Next, at block 320, the processor 216 executes the set of executable commands from the ROM 212 so that the DHCP client/server device 108 is converted to function as a DHCP server.

Next, at block 322, the processor 216 starts up DHCP server services for the network 100. As an example, the server services initiated by the processor 216 include a NMBD service, a telnet server service, a mail router service, a web server service and any other sever service commonly provided by a DHCP server.

Next, at block 324, the processor 216 assigns a new IP address to itself, i.e., the DHCP client/server device 108. Thus, the DHCP client/server device 108 is able to acquire an IP address without an available DHCP server on the network 100, which allows the DHCP client/server device 108 to function and communicate over the network 100.

Next, at block 326, the processor 216 makes a determination whether there is a DHCP client device on the network 100 that needs an IP address. The processor 216 is able to determine that a particular DHCP client device on the network 100 needs an IP address by receiving and processing a DHCP-DISCOVER message from that DHCP client device.

If there is no DHCP client device on the network 100 that needs an IP address, the operation of the a DHCP client/server device 108 proceeds to block 328, where the DHCP client/server device 108 continues to operate as a DHCP server. However, if there is a DHCP client device on the network 100 that needs an IP address, the operation of the DHCP client/server device 108 proceeds to block 330, where the processor 216 assigns an available IP address to that DHCP client device, which may be another DHCP client/server device. The operation of the DHCP client/server device 108 then proceeds back to block 326 to see if there is another DHCP client device on the network 100 that needs an IP address.

In this fashion, the DHCP client/server device 108 is able to automatically acquire an IP address even when a DHCP server is not available on the network 100. Furthermore, the DHCP client/server device 108 is able to provide DHCP server services to DHCP client devices on the network 100 when a DHCP server is not available on the network 100.

Figure 4:
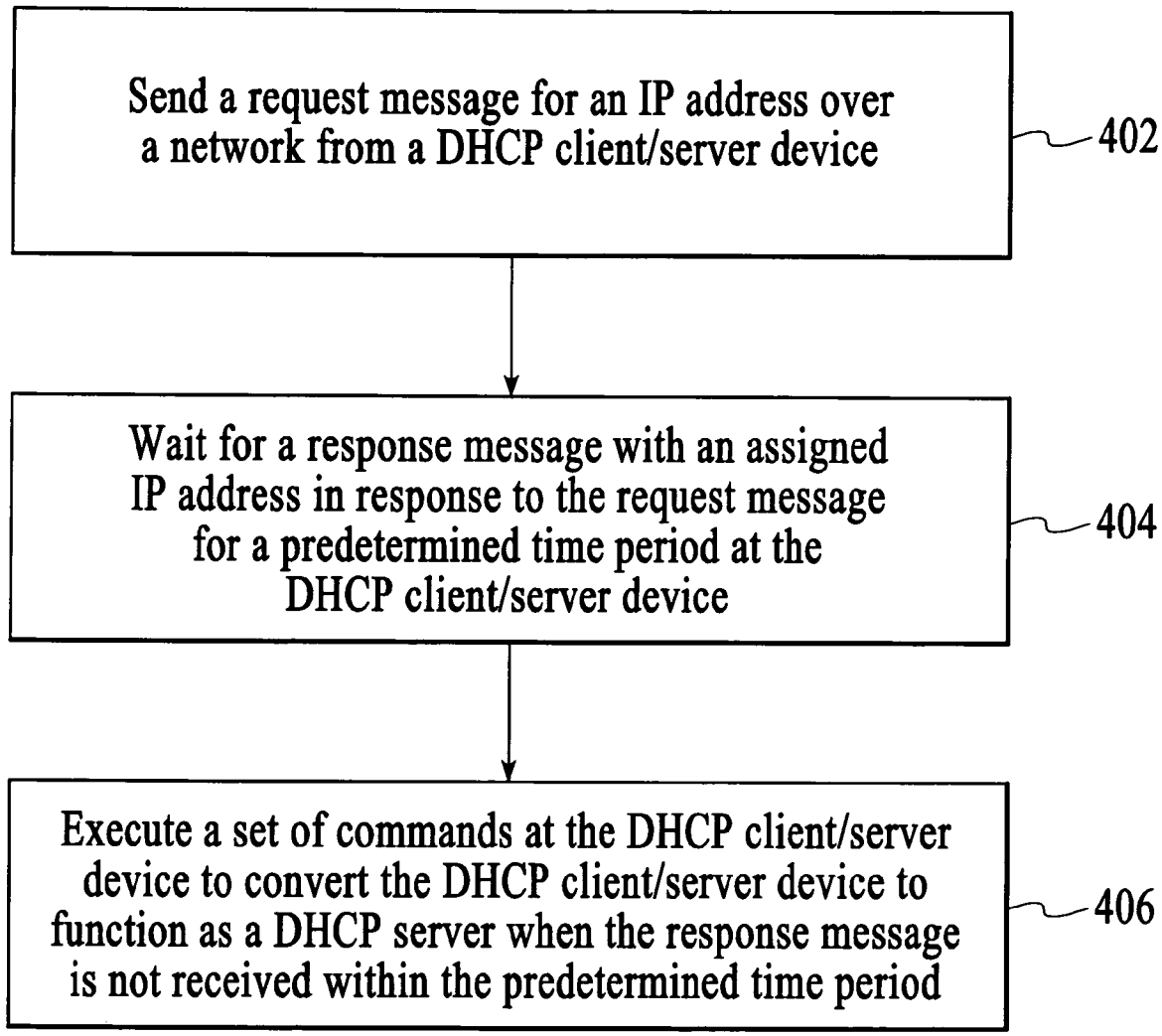
FIG. 4 is a process flow diagram of a method of providing DHCP server services in accordance with an embodiment of the invention.

A method of providing DHCP server services on a network in accordance with an embodiment of the invention is described with reference to a process flow diagram of FIG. 4. At block 402, a DHCP client/server device sends a request message for an IP address over the network. Next, at block 404, the DHCP client/server device waits for a response message with an assigned IP address in response to the request message for a predetermined time period. Next, at block 406, the DHCP client/server device executes a set of commands to convert the DHCP client/server device to function as a DHCP server when the response message is not received within the predetermined time period.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A DHCP client/server device comprising:
a network interface to connect to a network; and
a processor operably connected to said network interface to transmit and receive data, said processor being configured to send a request message for an IP address over said network, said processor being further configured to execute a set of commands to convert said DHCP client/server device to function as a DHCP server after a response message with an assigned IP address in response to said request message is not received within a predetermined time period,
wherein said processor is further configured to set said DHCP client/server device to function as a DHCP client device when said response message with said assigned IP address is received in response to said request message within said predetermined time period.

2. The device of claim 1 wherein said processor is further configured to start DHCP server services when said DHCP client/server device is converted to function as said DHCP server.

3. The device of claim 2 wherein said DHCP server services includes a server service selected from a group consisting of a telnet server service, a mail router service and a web server service.

4. The device of claim 1 further comprising memory operably connected to said processor, said memory containing said set of commands.

5. The device of claim 4 wherein said memory is a FLASH read-only memory.

6. The device of claim 1 wherein said processor is further configured to assign a new IP address to said DHCP client/server device when said DHCP client/server device is converted to function as said DHCP server.

7. The device of claim 1 wherein said processor is further configured to assign additional IP addresses to DHCP client devices on said network in response to request messages for IP addresses when said DHCP client/server device is converted to function as said DHCP server.

8. The device of claim 1 wherein said network interface is operably connected to a LAN.

9. The device of claim 1 further comprising an application-specific integrated circuit that is configured to support an industrial input/output device connected to said application-specific integrated circuit.

10. A method of providing DHCP server services on a network, said method comprising:
sending a request message for an IP address over said network from a DHCP client/server device;
waiting for a response message with an assigned IP address in response to said request message for a predetermined time period at said DHCP client/server device;
executing a set of commands at said DHCP client/server device to convert said DHCP client/server device to function as a DHCP server after said response message with said assigned IP address in response to said request message is not received within said predetermined time period, and
setting said DHCP client/server device to function as a DHCP client device when said response message with said assigned IP address is received within said predetermined time period in response to said request message.

11. The method of claim 10 further comprising starting DHCP server services by said DHCP client/server device when said DHCP client/server device is converted to function as said DHCP server.

12. The method of claim 11 wherein said DHCP server services includes a server service selected from a group consisting of a telnet server service, a mail router service and a web server service.

13. The method of claim 10 further comprising retrieving said set of commands from memory of said DHCP client/server device.

14. The method of claim 13 wherein said retrieving includes retrieving said set of commands from a FLASH read-only memory of said DHCP client/server device.

15. The method of claim 10 further comprising assigning a new IP address to said DHCP client/server device by said DHCP client/server device when said DHCP client/server device is converted to function as said DHCP server.

16. The method of claim 10 further comprising assigning additional IP addresses to DHCP client devices on said network in response to request messages for IP addresses when said DHCP client/server device is converted to function as said DHCP server.

17. The method of claim 10 wherein said sending said request message includes sending said request message for said IP address over a LAN from said DHCP client/server device.

18. The method of claim 10 wherein said DHCP client/server device is an industrial input/output system.

* * * * *